United States Patent
Leidy et al.

(10) Patent No.: US 6,212,909 B1
(45) Date of Patent: Apr. 10, 2001

(54) SYNCHRONIZATION OF INDIVIDUAL SECTION MACHINE OPERATION TO GOB FEED IN A GLASSWARE FORMING SYSTEM

(75) Inventors: D. Wayne Leidy, Perrysburg, OH (US); Derek Shinaberry, Olathe, KS (US); Daniel Stephen Farkas, Maumee, OH (US)

(73) Assignee: Owens-Brockway Glass Container Inc., Toledo, OH (US)

( * ) Notice: Subject to any disclaimer, the term of this patent is extended or adjusted under 35 U.S.C. 154(b) by 0 days.

(21) Appl. No.: 09/247,797

(22) Filed: Feb. 8, 1999

(51) Int. Cl.[7] .................................................. G05B 15/02
(52) U.S. Cl. .............................. 65/29.11; 65/158; 65/163
(58) Field of Search ................... 65/29.1, 29.11, 65/29.12, 29.18, 158, 163, 164

(56) References Cited

U.S. PATENT DOCUMENTS

| Re. 29,188 | 4/1977 | Croughwell . |
|---|---|---|
| 4,007,028 | 2/1977 | Bublitz et al. . |
| 4,108,623 | 8/1978 | Cardenas-Franco . |
| 4,145,204 | 3/1979 | Farkas et al. . |
| 4,145,205 | 3/1979 | Farkas et al. . |
| 4,152,134 | 5/1979 | Dowling et al. . |
| 4,162,909 | 7/1979 | Peters . |
| 5,271,756 | 12/1993 | Peterson et al. . |

FOREIGN PATENT DOCUMENTS

| 1198793 | 12/1981 | (CA) . |

*Primary Examiner*—Sean Vincent

(57) ABSTRACT

An individual section (IS) machine glassware forming system includes an individual section machine with a plurality of individual sections for receiving gobs of molten glass and forming the gobs into articles of glassware. A gob feeder presents gobs of molten glass, and a gob distributor feeds the gobs to the individual machine sections in sequence. Operation of the machine sections is synchronized to operation of the glass feeder by generating a feeder index signal indicative of presentation of glass gobs at the glass feeder. An electronic machine timing circuit includes facility for electronically generating a machine index signal for synchronizing operation of the machine sections with respect to each other. Separation in real time between the feeder index signal and the machine index signal during system operation is determined and stored in units of time. Upon initialization of operation of the system after shutdown for any reason, this stored time is automatically retrieved, and timing of the machine index signal is automatically adjusted relative to the feeder index signal to equal this stored time.

6 Claims, 6 Drawing Sheets

SYNCHRONIZATION OF INDIVIDUAL SECTION MACHINE OPERATION TO GOB FEED IN A GLASSWARE FORMING SYSTEM

The present invention is directed to individual section (IS) machine glassware forming systems, and more particularly to a method and apparatus for synchronizing the timing of machine operation to the provision of molten glass gobs to the IS machine.

BACKGROUND AND OBJECTS OF THE INVENTION

The art of glass container manufacture is currently dominated by the so-called individual section or IS machine. Such machines include a plurality of separate or individual manufacturing sections, each of which has a multiplicity of operating mechanisms for converting one or more charges or gobs of molten glass into hollow glass containers and transferring the containers through successive stages of the machine section. In general, an IS machine system includes a glass source with a needle mechanism for controlling a stream of molten glass, a sheer mechanism for cutting the molten glass stream into individual gobs, and a gob distributor for distributing the individual gobs among the individual machine sections. Each machine section includes one or more blank molds in which a glass gob is initially formed into a parison in a blowing or pressing operation, one or more invert arms for transferring the parisons to blow molds in which the containers are blown to final form, tongs for removing the formed containers onto a deadplate, and a sweepout mechanism for transferring molded containers from the deadplate onto a cross conveyor. The conveyor receives containers from all sections of an IS machine in sequence, and conveys the containers to a loader for transfer to an annealing lehr. Operating mechanisms in each section also provide for closure of mold halves, movement of baffles and blowing nozzles, control of cooling wind, etc. U.S. Pat. No. 4,362,544 includes a background discussion of the art of both "blow and blow" and "press and blow" glassware forming processes, and also discusses an electropneumatic individual section machine adapted for use in either process.

A critical requirement in glassware forming systems of this character, both during initialization and during continuing operation, is to synchronize operation of the glassware forming machine to the sequential supply of molten glass gobs. Operation of the various machine sections is electronically synchronized by a machine reset signal. A signal may also be provided by the gob feeder mechanism, generated either by a sensor or electronically responsive to feeder control electronics. It is proposed in Canadian Patent 1,198,793 to provide a counter responsive to clock signals from the various operating mechanisms, such as the gob feeder and the machine reset signal, for measuring offset therebetween in units of machine degrees. These offsets are manually noted, and manually reset upon the initialization after shutdown. However, gob travel time from the feeder to the blank molds is relatively constant in real time, and does not vary with machine speed. Thus, setting offset times in units of machine degrees does not provide adequate synchronization as machine speed varies. Furthermore, timing adjustments are made manually rather than automatically in the noted patent.

U.S. Pat. No. 4,108,623 discloses an IS machine control system that operates in real time, as distinguished from operating in machine or section degrees as is more typical in the art. The time between gob shear and entry into the blank mold is measured by employing a first sensor for generating a signal indicative of entry of a gob into the gob distributor, and a second sensor for generating a signal indicative of entry of the gob into the blank mold. Mold operation is initiated by the sensor responsive to gob entry into the mold. There is no fixed time between shear cut and operation of the blank mold.

It is a general object of the present invention to provide a method and system for synchronizing operation of the forming machine to provision of molten glass gobs in an IS machine glassware forming system that automatically synchronize operation upon initialization of the system, and that automatically maintain such synchronization during system operation.

SUMMARY OF THE INVENTION

An individual section (IS) machine glassware forming system includes an individual section machine with a plurality of individual machine sections for receiving gobs of molten glass and forming the gobs into articles of glassware. A gob feeder presents gobs of molten glass, and a gob distributor feeds the gobs to the individual machine sections in sequence. In accordance with the present invention, operation of the machine sections is synchronized to operation of the glass feeder by generating a feeder index signal indicative of presentation of glass gobs at the glass feeder. An electronic machine timing circuit includes facility for electronically generating a machine index signal for synchronizing operation of the machine sections with respect to each other. Separation in real time between the feeder index signal and the machine index signal during system operation is determined and stored in units of time. Upon initialization of operation of the system after shutdown for any reason, this stored time is automatically retrieved, and timing of the machine index signal is automatically adjusted relative to the feeder index signal to equal this stored time.

Thus, the time between the feeder index signal and the machine index signal is used for automatically restoring synchronization of the machine upon start-up or initialization. The feeder index signal is generated indicative of presentation or shearing of each molten glass gob, either by means of a sensor that is responsive to mechanical operation of the shear mechanism, or by monitoring operation of an electronic cam associated with the shear blades. A first of these shear signals is automatically arbitrarily associated with a first of the machine sections to provide a feeder index signal associated with presentation of a gob for the first machine section. An electronic synchronization controller automatically generates a machine index signal that, together with appropriate offsets generated for each section by section control electronics, synchronizes operation of the several machine sections to each other. The time between the feeder index signal generated by presentation of the gob for the first machine section, and the machine index signal that initiates operation of the first machine section, is measured during operation in units of time and stored in memory. Upon re-initialization of the IS machine, this time is retrieved from memory, and the machine electronic timing system is automatically adjusted until the time between the feeder index signal and the machine index signal is again equal to this stored time. This timing adjustment preferably is carried out by means of a phase-locked loop in incremental phase adjustments of a magnitude selectable by an operator.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
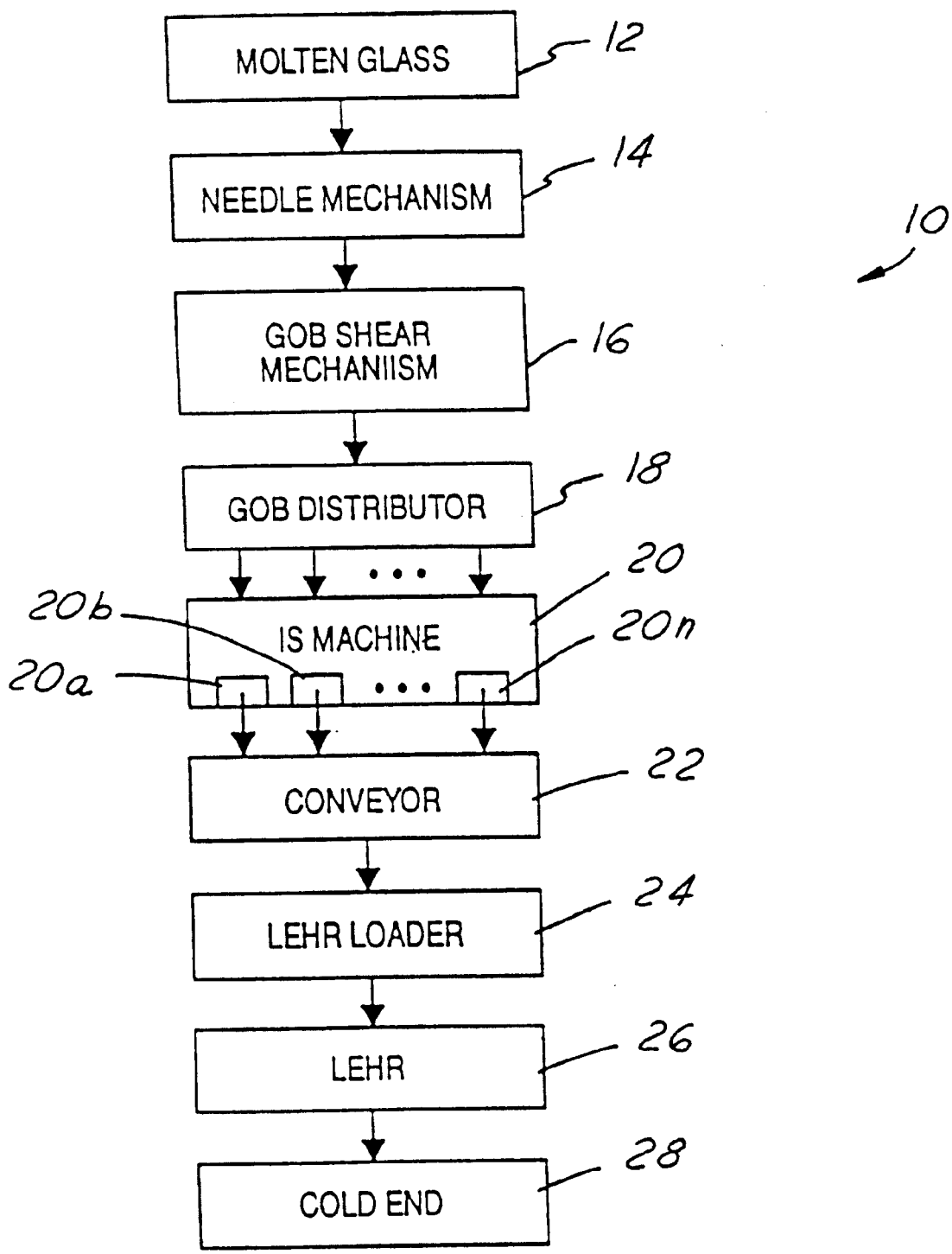
FIG. 1 is a functional block diagram of an individual section machine glassware forming system in accordance with which the present invention preferably is implemented.

FIG. 1 illustrates an IS machine glassware forming system 10 as comprising a reservoir or bowl 12 containing molten glass (from a forehearth) that is fed by a needle mechanism 14 to a shear mechanism 16. Shear mechanism 16 severs individual gobs of molten glass, which are fed by a gob distributor 18 to an IS machine 20. IS machine 20 includes a plurality of individual sections 20a, 20b . . . 20n, within which the gobs are formed into individual pieces of glassware. Each section terminates in a sweepout station, from which the articles of glassware are delivered to a common machine conveyor 22. Conveyor 22, usually an endless belt conveyor, delivers the containers in sequence to a lehr loader 24, which loads the containers in batches into an annealing lehr 26. The containers are delivered by lehr 26 to the so-called cold end 28 of the manufacturing cycle, at which the containers are inspected for commercial variations, sorted, labeled, packaged and/or stored for further processing.

System 10 illustrated in FIG. 1 includes a multiplicity of operating mechanisms for performing operations on the glass, moving glass workpieces through sequential stages of operation, and otherwise performing functions in the system. Such operating mechanisms include, for example, needle mechanism 14, gob shear mechanism 16, gob distributor 18 and lehr loader 24. In addition, there are a multiplicity of operating mechanisms within each section of IS machine 20, such as mechanisms for opening and closing the molds, mechanisms for in and out motions of the funnels, baffles and blow heads, mechanisms for motions of the invert arms and take-out tongs, and sweepout mechanisms for moving the ware onto machine conveyor 22.

Figure 2:
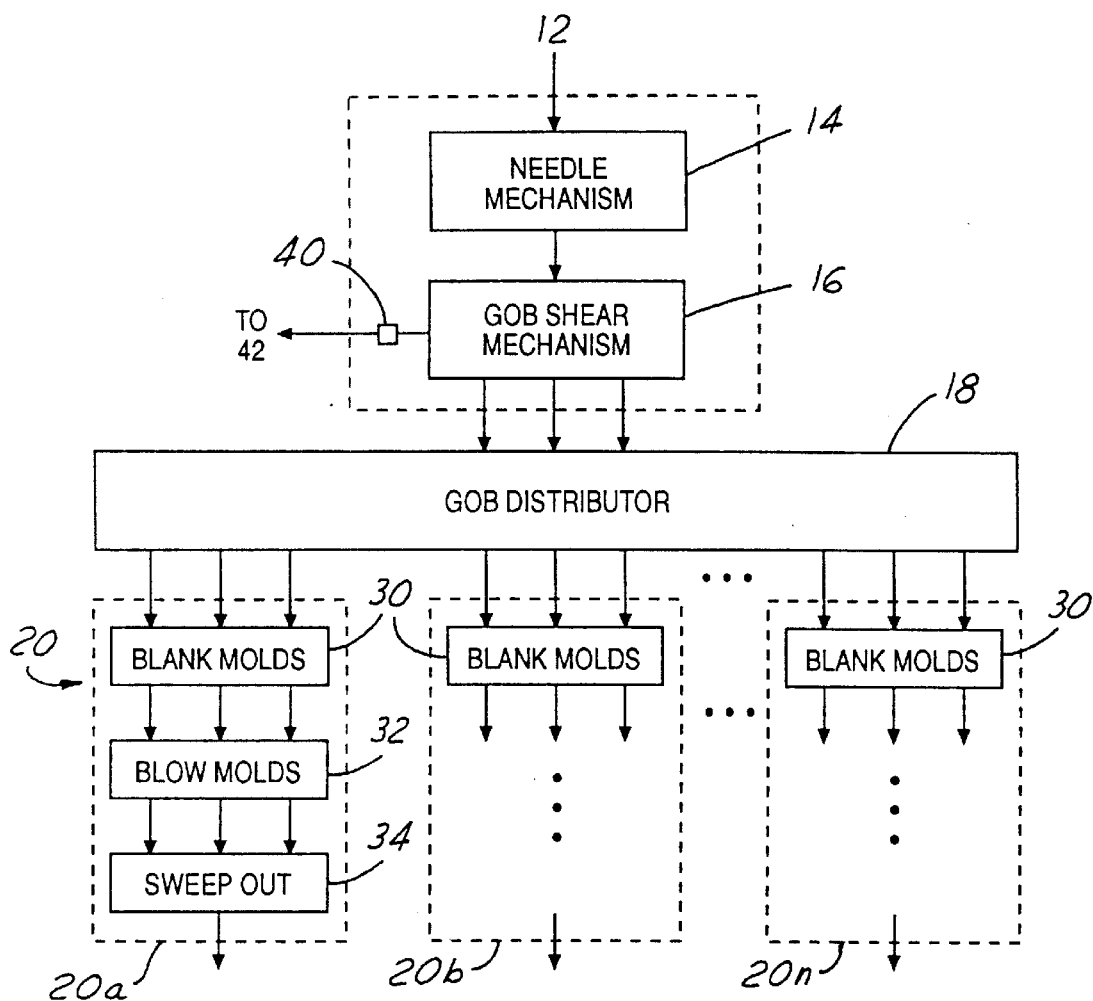
FIG. 2 is a more detailed functional block diagram of a portion of the system illustrated in FIG. 1.

Referring to FIG. 2, each individual section 20a, 20b . . . 20, includes at least one and preferably a plurality of blank molds 30 that receive glass gobs simultaneously from gob distributor 18. In the particular exemplary system illustrated in the drawings and herein discussed, machine 20 comprises a so-called triple-gob machine, in which each machine section includes three sets of blank molds 30 and three sets of blow molds 32 for operating simultaneously on three glass gobs to produce three pieces of glassware. So-called single, double and quad machines are also employed in the art. Glass gobs are delivered substantially simultaneously to the blank molds 30 of a given machine section, and are delivered to the blank molds of the several machine sections in the so-called firing order or sequence for which the system is designed. Glass gobs are simultaneously formed into parison blanks in molds 30, and are simultaneously transferred by associated invert arms from blank molds 30 to blow molds 32. At blow molds 32, the parison blanks are blown to final form while the next series of parison blanks are formed in blank molds 30. As the next series of parison blanks are transferred by the invert arms to blow molds 30, the finished ware is transferred from blow molds 30 by takeout tongs to the deadplate of a sweepout station 34. The several sweepout stations 34 are operated in sequence to deliver finished ware to machine conveyor 22 (FIG. 1).

To the extent thus far described, IS machine glassware forming system 10 is of conventional construction. Reservoir 12 and needle mechanism 14 may be as shown, for example, in U.S. Pat. No. 3,419,373. In a currently preferred embodiment of the invention, needle mechanism 14 is as disclosed in U.S. Pat. No. 5,693,114 and U.S. application Ser. No. 08/597,760. Gob shear mechanism 16 may be as in U.S. Pat. No. 5,573,570 or U.S. Pat. No. 5,772,718. Gob distributor 18 may be as in U.S. Pat. No. 5,683,485 or U.S. Pat. No. 5,697,995. U.S. Pat. Nos. 4,362,544 and 4,427,431 illustrate typical IS machines 20, and U.S. Pat. Nos. 4,199, 344, 4,222,480 and 5,160,015 illustrate typical sweepout stations. U.S. Pat. Nos. 4,193,784, 4,290,517, 4,793,465 and 4,923,363 illustrate suitable lehr loaders 24. U.S. Pat. Nos. 4,141,711, 4,145,204, 4,145,205, 4,152,134, 4,338,116, 4,364,764, 4,459,146, 4,762,544, 5,264,473 and 5,580,366 illustrate various arrangements for electronic control of glassware manufacture in an IS machine system. A system for controlling motions of IS machine operating mechanisms is illustrated, for example, in above-noted U.S. Pat. No. 4,548,637. The disclosures of all U.S. patents and applications noted above, as well as the disclosure of Canadian Patent No. 1,198,793 noted above, are incorporated herein by reference for purposes of background.

Figure 3:
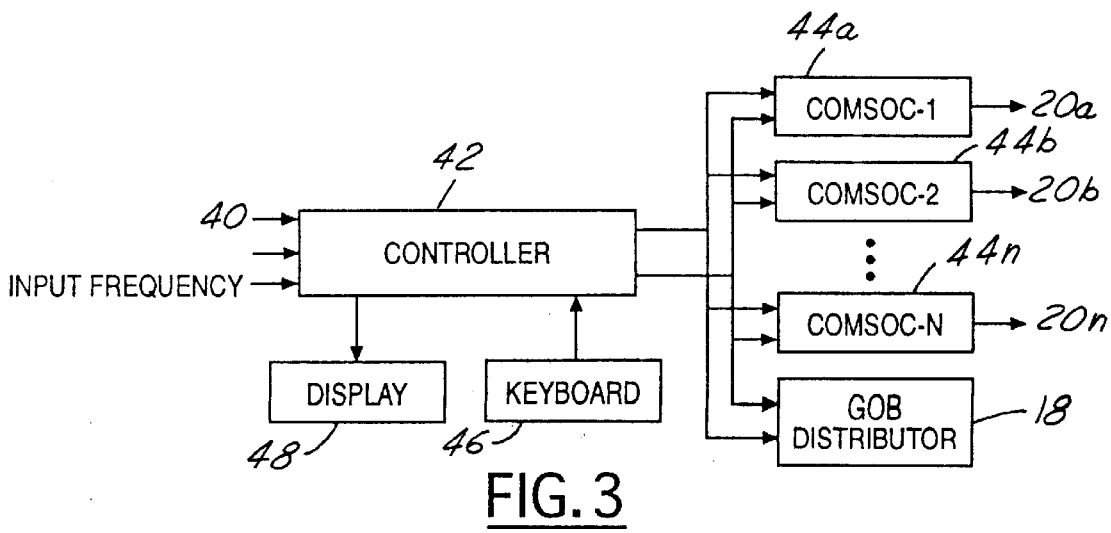
FIG. 3 is a functional block diagram of machine system timing and control electronics in accordance with a presently preferred embodiment of the invention.

A sensor 40 is functionally illustrated in FIG. 2 as being responsive to operation of gob shear mechanism 16 for generating an associated shear cut signal. Sensor 40 may comprise a proximity sensor or the like responsive to physical motion of the shear blades for generating the shear cut signal. Alternatively, in applications in which the shear blades are driven by an appropriate servo mechanism responsive to a stored electronic profile or cam, sensor 40 may comprise electronics that detect a predetermined position along the electronic cam profile for delivering the shear cut signal. The shear cut signal from sensor 40 is delivered to an electronic synchronization controller 42 in FIG. 3. Controller 42 also receives an input frequency signal from a master oscillator. Controller 42 provides outputs to computerized section operator consoles or COMSOCs 44a, 44b, . . . 44n, which control operation of associated machine sections 20a, 20b, . . . 20n, respectively. COMSOC units 44a–44n may be as shown in U.S. Pat. Nos. 4,152,134, 4,364,764, 4,459,146, 5,264,473 and 5,580,306 for example. In the preferred implementation in which gob distributor 18 is electrically rather than mechanically driven, controller 42 also provides a control output to the gob distributor. Controller 42 also receives input from an operator keyboard 46, and provides output to an operator display screen 48 for conventional display and control purposes.

Figure 4A:
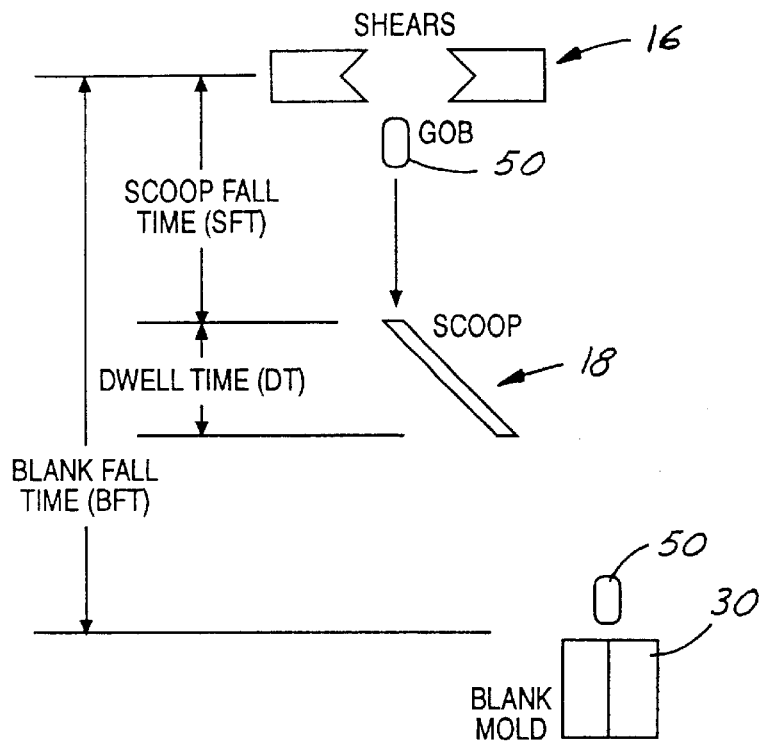
FIG. 4A is a schematic diagram that illustrates various phases of molten gob travel from the gob shears to the blank molds in FIG. 2.
Figure 4B:
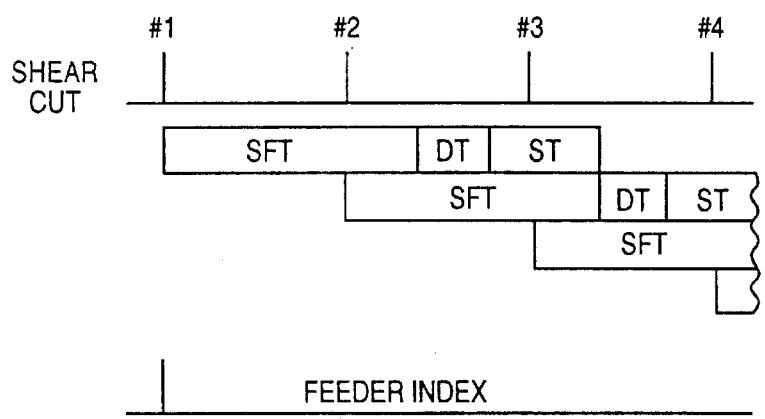
FIG. 4B is a graphic illustration of timing of the mechanisms of FIG. 4A.
Figure 4B:
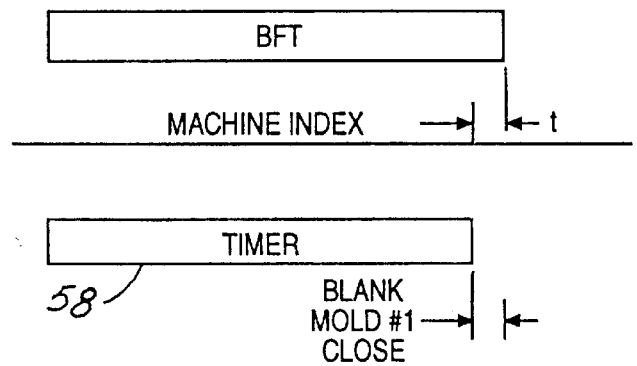

FIG. 4A illustrates fall of a glass gob 50 from shears 16 through a scoop of gob distributor 18 to a blank mold 30 of an individual machine section. A gob 50 cut by shears 16 falls by gravity through suitable troughs to a scoop of gob distributor 18, and thence by gravity either directly or through another trough to the blank mold 30 of an individual machine section. The scoop fall time SFT between shears 16 and scoop 18, and the dwell time DT within scoop 18 remain relatively constant. Likewise, the total blank fall time BFT between shears 16 and a given blank mold 30 remains relatively constant, all in units of real time, although the blank fall time BFT for the differing machine sections may vary due to differing distances of physical separation between the machine sections and the gob distributor. The important point is that the scoop fall time SFT, scoop dwell time DT and the total blank fall time BFT for a given blank mold 30 all remain relatively constant in units of real time regardless of machine speed. Thus, referring to FIG. 4B, there is a relatively fixed total time SFT plus DT associated with each shear cut signal from sensor 40 (FIG. 1), independent of machine speed. Likewise, there is a relatively fixed time ST during which the scoops of the gob distributor may be moved for delivering gobs to the next section in sequence. Total blank fall time BFT is illustrated in FIG. 4B only for the first machine section. The shear cut signal associated with the first machine section is arbitrarily selected as the feeder index signal. (The "first" machine section need not necessarily be physically first in the IS machine, but is arbitrarily designated "first" in terms of the firing order of the machine.)

Figure 5:
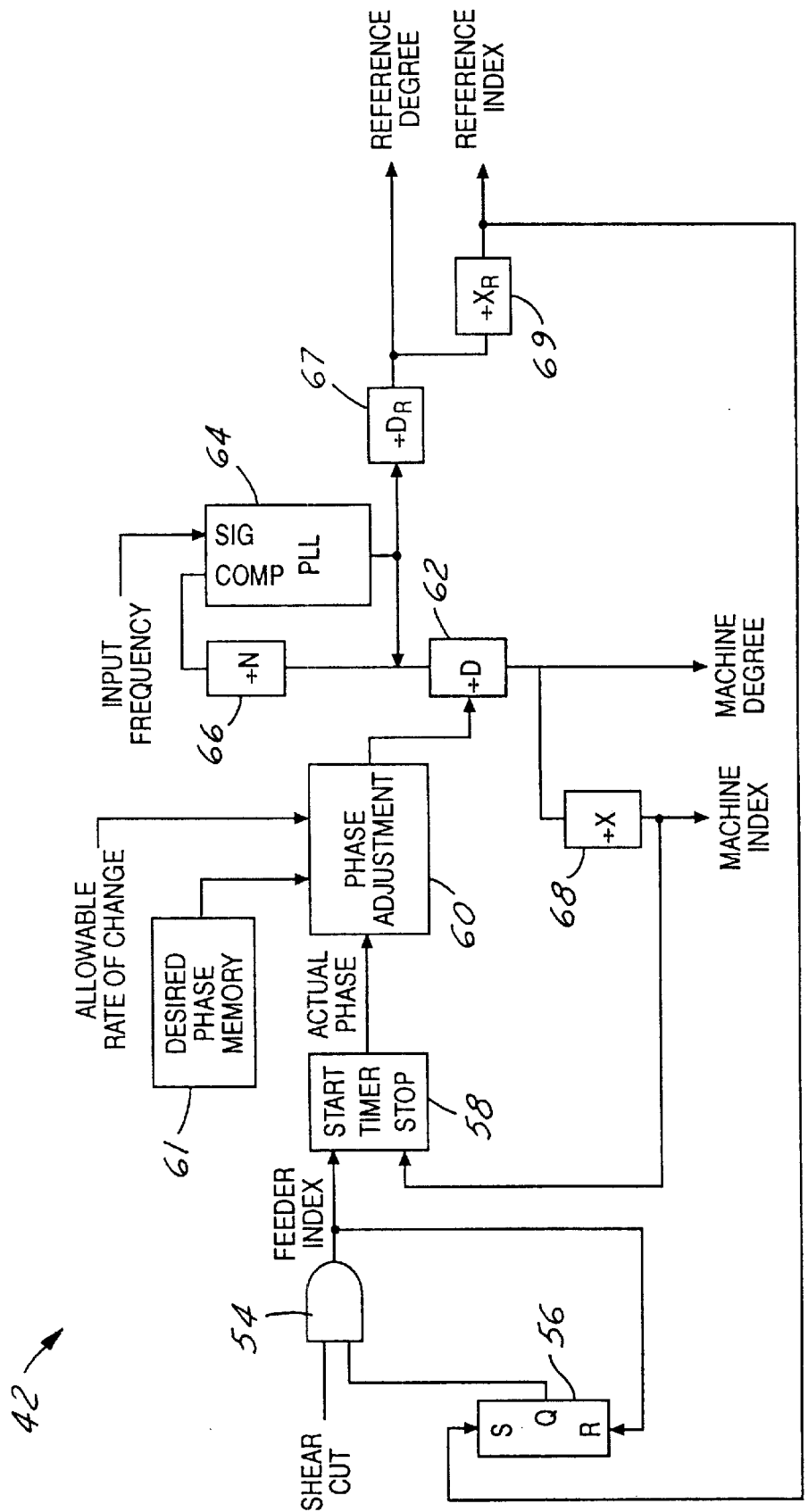
FIG. 5 is a functional block diagram of a portion of the electronic controller in FIG. 3 for adjusting the phase relationship between the feeder index signal and the machine index signal in accordance with the present invention.

Turning to FIG. 5, each shear cut signal is fed in synchronization controller 42 to a gate 54, which receives a second signal from a latch 56 that is set by the reference index signal. The reference index signal functions to select the shear cut signal associated with the first machine section as the feeder index output signal from gate 54. A timer 58 is initiated or started by the feeder index signal, and receives the machine index signal as a second or stop input. Thus, the output of timer 58, which indicates the offset or phase relationship between the feeder index signal and the machine index signal in units of real time, provides a control input to a phase adjustment control 60. Phase adjustment control 60 also receives an input stored in memory 61 indicative of the desired phase relationship between the feeder and index signals, and an operator input (also stored in memory) indicative of the allowable rate of change of this phase relationship. The output of phase adjustment control 60 is fed to the divide-by-D module 62 of a phase-locked loop 64. Phase locked loop 64 also has a divide-by-N module 66, and receives an input frequency from an external control oscillator. Phase locked loop 64 in conjunction with modules 62, 66 may be as disclosed in U.S. Pat. Nos. 4,145,204 and 4,145,205, for example, the disclosures of which are incorporated herein by reference. The output of phase locked loop 64 at D module 62 provides the machine degree control signal (in units of time) to the remainder of the control electronics, and is fed through a divide-by-X module 68 to provide the machine index signal. Referring back to FIG. 4B, timer 58 measures the time between the feeder index signal and the machine index signal. The machine index signal, which synchronizes operation of all machine sections and initiates closure of the blank mold in the first section, occurs a time t prior to the end of the blank fall time BFT for section 1 to allow time for the blank molds to close prior to delivery of the glass gob. Phase locked loop 64 is also connected to a divide-by-$D_R$ divider 67, which is connected to a divide-by-$X_R$ divider 69. Dividers 67, 69 provide reference degree and reference index signals to the loader and feeder controls (not shown). Divider 69 also provides the set input to latch 56.

Figure 6A:
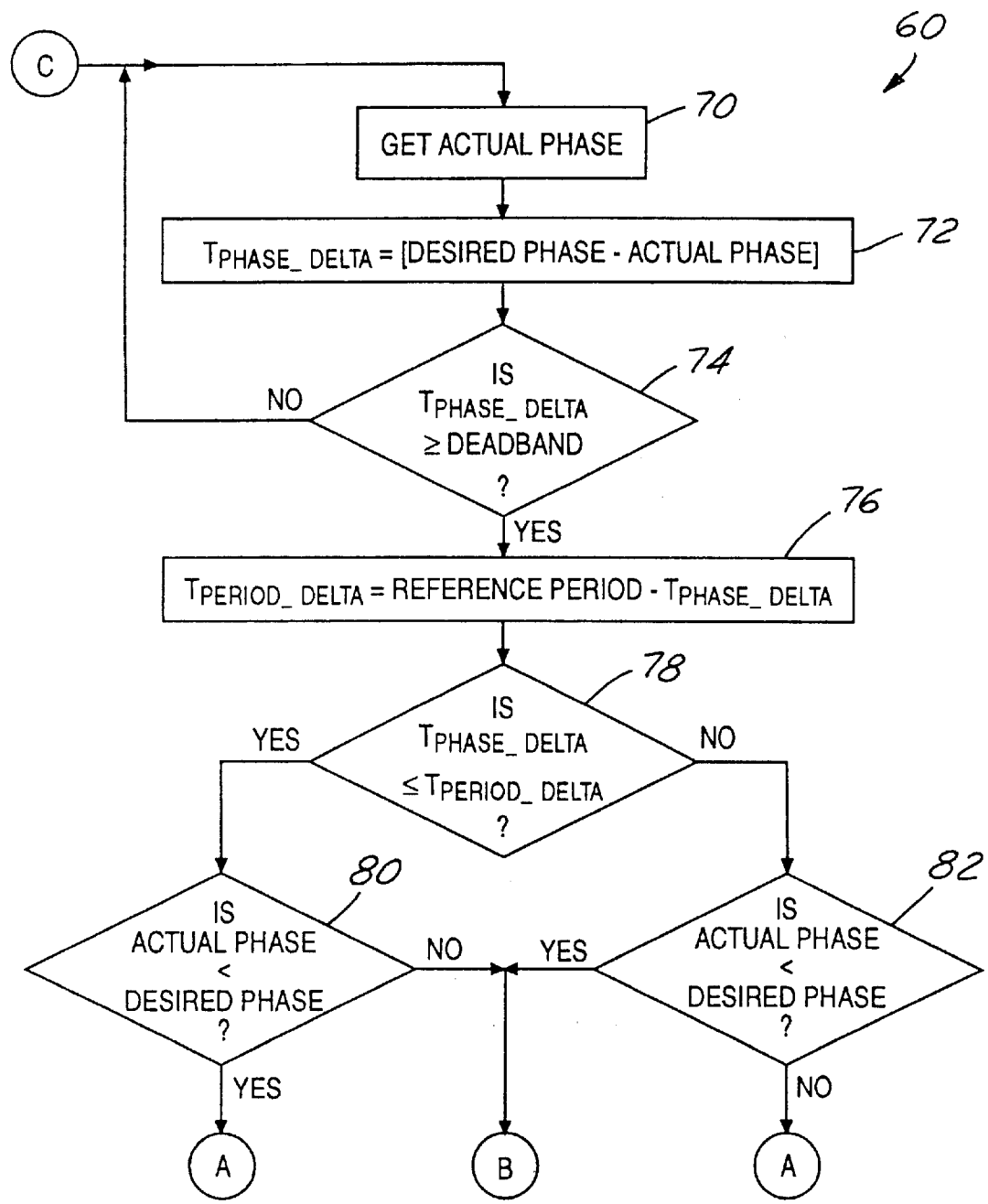
FIGS. 6A and 6B together comprise a flow chart that illustrates operation of the phase adjustment in FIG. 5.
Figure 6B:
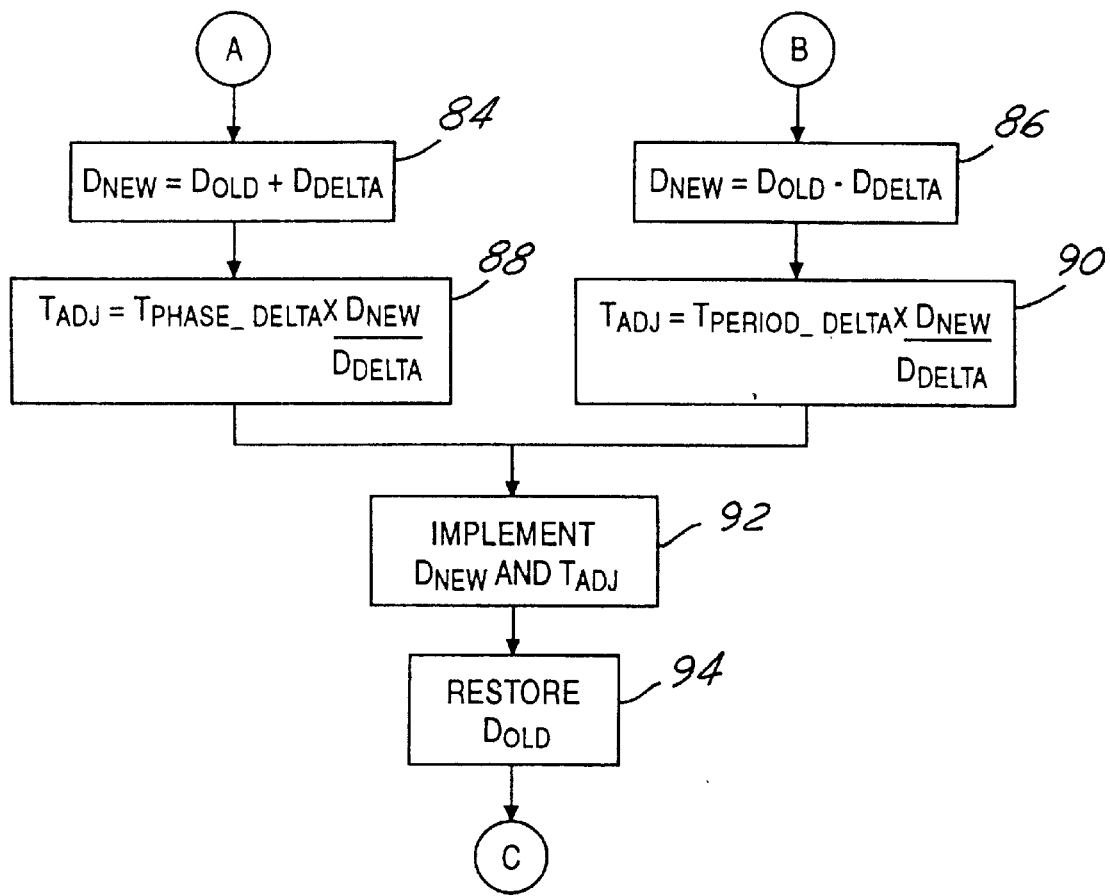

In the preferred embodiment of the invention, controller 42 is implemented in a digitally-operated microprocessor-based controller. FIGS. 6A and 6B illustrate operation of timing controller 52, including particularly operation of phase adjustment control 60. Referring to FIG. 6A, the output of timer 58 (FIG. 5) is first obtained at 70, and compared at 72 to the desired phase relationship between the feeder index and the machine index signals. This desired phase relationship is that stored in controller memory 61 when proper synchronization takes place, and is retrievable both on initialization and during operation of the machine. The difference in units of real time between the desired and actual phase is then compared at 74 to a dead band to prevent dithering. Blocks 76, 78, 80 and 82 determine whether it is necessary to adjust the phase relationship by increasing D (block 84) or decreasing D (block 86). Thus, if the value D at divider 92 is to be increased, this value is incremented at 84 by the allowable phase change increment $D_{DELTA}$ set by the operator. Likewise, if the value D is to be decreased, this value is decremented at 86 by the allowable phase change increment $D_{DELTA}$. An adjustment time $T_{ADJ}$ is then computed at 88 and 90 as the product of $T_{PHASE-DELTA}$ (block 72) times $D_{NEW}$ divided by $D_{DELTA}$. The divider factor $D_{NEW}$ is then implemented at 92 for a time $T_{ADJ}$, after which $D_{OLD}$ is restored at 94. Operation is then returned to FIG. 6A for comparing actual to desired phase, etc.

What is claimed is:

1. In an individual section (IS) machine glassware forming system that includes an individual section machine with a plurality of individual sections for receiving gobs of molten glass and forming the gobs into glass articles, a gob feeder for presenting gobs of molten glass, and a gob distributor for feeding the gobs to said individual sections in sequence, means for synchronizing operation of said sections to said gob feeder comprising:

means operatively coupled to said gob feeder for providing a feeder index signal indicative of presentation of a glass gob for a first of said sections, electronic machine timing means including means for generating a machine index signal for synchronizing operation of said sections with respect to each other, means for determining separation in real time between said feeder index signal and said machine index signal, and storing said separation in units of time, means operable upon initialization of operation of said system for automatically retrieving said stored separation time, and means for adjusting timing of said machines index signal relative to said feeder index signal to equal said stored time.

2. The system as set forth in claim 1 wherein said electronic machine timing means further includes means operable during operation of said system for monitoring separation in time between said feeder index signal and said machine index signal for adjusting timing of said machine index signal until said separation in time equals said stored time.

3. The system as set forth in claim 2 wherein said means for adjusting timing of said machine index signal comprises a phase locked loop that receives an input frequency signal and provides said machine index signal as an output, and means responsive to said monitoring means for adjusting operation of said phase locked loop.

4. The system as set forth in claim 3 wherein said means for adjusting operation of said phase locked loop comprises means for adjusting operation in fixed increments responsive to each said feeder index signal.

5. A method of initializing operation of an individual section glassware forming system that includes an individual section machine having a plurality of individual machine sections for receiving gobs of molten glass and forming the gobs into glass articles, a gob feeder for presenting gobs of molten glass, and a gob distributor for feeding the gobs from said gob feeder to each of the machine sections in sequence, said method comprising the steps of:

(a) generating a feeder index signal indicative of presentation at the gob feeder of a glass gob for a first of the machine sections, (b) generating a machine index signal, (c) synchronizing operation of the first machine section and all other machine sections to said machine index signal, (d) during operation of the individual section machine, measuring separation between said feeder index signal and said machine index signal in units of time, (e) storing such time in memory, and (f) upon initialization of the machine subsequent to said step (e), retrieving said stored time from memory and adjusting said step (b) while performing said step (d) until separation in time between said feeder and machine index signals equals said time stored in said step (e).

6. The method as set forth in claim 5 comprising the additional step of:

(g) periodically performing said steps (d) and (f) during operation of said system to maintain said separation in time equal to said stored time.

* * * * *